United States Patent
Danciu et al.

(10) Patent No.: US 11,800,175 B2
(45) Date of Patent: *Oct. 24, 2023

(54) NETWORK-BASED REMOTE CONTROL

(71) Applicant: Google LLC, Mountain View, CA (US)

(72) Inventors: Daniel Danciu, Zurich (CH); Yaniv Bernstein, Glebe (AU); Ramona Bobohalma, Zurich (CH); Oliver Heckmann, Rueschlikon (CH); Jasmine Kent, Bach (CH); Alin Sinpalean, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,820

(22) Filed: Mar. 28, 2022

(65) Prior Publication Data
US 2022/0224965 A1 Jul. 14, 2022

Related U.S. Application Data

(63) Continuation of application No. 16/673,203, filed on Nov. 4, 2019, now Pat. No. 11,290,769, which is a
(Continued)

(51) Int. Cl.
*H04N 21/422* (2011.01)
*H04L 12/28* (2006.01)
(Continued)

(52) U.S. Cl.
CPC ....... *H04N 21/42225* (2013.01); *G08C 17/02* (2013.01); *H04L 12/2818* (2013.01);
(Continued)

(58) Field of Classification Search
CPC ............... H04L 12/2818; H04L 67/025; H04L 29/1233; H04L 12/2825; H04L 61/15;
(Continued)

(56) References Cited

U.S. PATENT DOCUMENTS

| 6,587,125 B1 | 7/2003 | Paroz |
| 7,240,836 B2 | 7/2007 | Vrotsos et al. |

(Continued)

FOREIGN PATENT DOCUMENTS

| EP | 1185030 | 4/2005 |
| JP | 2007295188 | 11/2007 |

OTHER PUBLICATIONS

Apple.com, "The All-New Remote", Feb. 25, 2011, pp. 1-4, available at: http://www.apple.com/itunes/remote.
(Continued)

*Primary Examiner* — Yong Hang Jiang
(74) *Attorney, Agent, or Firm* — Kilpatrick Townsend & Stockton LLP

(57) ABSTRACT

The subject matter of the present disclosure can be implemented in, among other things a computer-readable storage medium encoded with instructions for causing a programmable processor to receive, by a server, a first message from a remote control that is distinct from and external to the server, wherein the first message includes a remote control identifier and control information for controlling one or more functions of at least one device other than the remote control. The instructions also cause the programmable processor to retrieve, by the server, a controlled device identifier that uniquely identifies a controlled device that is distinct from and external to the server. The instructions also cause the programmable processor to send a second message from the server to the controlled device identified by the controlled device identifier to control an operation of the controlled device.

20 Claims, 7 Drawing Sheets

Related U.S. Application Data continuation of application No. 16/038,556, filed on Jul. 18, 2018, now Pat. No. 10,469,894, which is a continuation of application No. 15/232,483, filed on Aug. 9, 2016, now Pat. No. 10,057,622, which is a continuation of application No. 13/041,964, filed on Mar. 7, 2011, now Pat. No. 9,490,998.

(60) Provisional application No. 61/411,386, filed on Nov. 8, 2010.

(51) Int. Cl.
  | | |
  |---|---|
  | *H04L 61/25* | (2022.01) |
  | *H04L 67/142* | (2022.01) |
  | *H04L 67/125* | (2022.01) |
  | *G08C 17/02* | (2006.01) |
  | *H04L 61/45* | (2022.01) |

(52) U.S. Cl.
CPC .......... *H04L 12/2825* (2013.01); *H04L 61/25* (2013.01); *H04L 67/125* (2013.01); *H04L 67/142* (2013.01); *G08C 2201/92* (2013.01); *G08C 2201/93* (2013.01); *H04L 61/45* (2022.05)

(58) Field of Classification Search
CPC ..... H04L 67/125; H04L 67/142; G08C 17/02; G08C 2201/92; G08C 2201/93; H04N 21/42225
USPC .......................................... 340/12.22, 12.23
See application file for complete search history.

(56) References Cited

U.S. PATENT DOCUMENTS

| | | | |
|---|---|---|---|
| 8,280,009 | B2 | 10/2012 | Stepanian |
| 8,301,691 | B2 | 10/2012 | Chiba et al. |
| 8,345,564 | B2 | 1/2013 | Cho et al. |
| 2002/0073183 | A1 | 6/2002 | Yoon et al. |
| 2002/0143805 | A1 | 10/2002 | Hayes et al. |
| 2005/0022134 | A1 | 1/2005 | Tokashiki |
| 2005/0096753 | A1 | 5/2005 | Arling et al. |
| 2005/0183120 | A1* | 8/2005 | Jain .................... H04N 7/17336 725/86 |
| 2006/0080380 | A1 | 4/2006 | Aizu et al. |
| 2006/0212566 | A1 | 9/2006 | Boujard et al. |
| 2007/0035412 | A1* | 2/2007 | Dvorak ................. G08C 17/02 455/556.1 |
| 2007/0130476 | A1* | 6/2007 | Mohanty ............ G08C 17/02 380/279 |
| 2008/0136664 | A1 | 6/2008 | Elsasser et al. |
| 2009/0019134 | A1* | 1/2009 | Bellifemine .......... H04W 12/06 709/218 |
| 2010/0082731 | A1 | 4/2010 | Haughay et al. |
| 2010/0153990 | A1 | 6/2010 | Ress et al. |
| 2010/0251305 | A1 | 9/2010 | Kimble et al. |
| 2010/0332919 | A1 | 12/2010 | Ito et al. |
| 2011/0142059 | A1* | 6/2011 | Bedingfield, Sr. .......................... H04N 21/41265 370/401 |
| 2011/0273625 | A1* | 11/2011 | McMahon ......... H04N 21/2407 348/734 |
| 2011/0298581 | A1* | 12/2011 | Hsu .................. H04N 21/42225 340/4.3 |
| 2012/0002815 | A1 | 1/2012 | Wei et al. |

OTHER PUBLICATIONS

Comcast Interactive Media, LLC, "The Xfinity TV App", Dec. 2, 2011, pp. 1-3, available at: http://www.xfinity.com/help/internet↑mobile-tv-app/.
Notice of Allowance dated May 23, 2018 in U.S. Appl. No. 15/232,483.
Notice of Allowance dated Jun. 26, 2019 in U.S. Appl. No. 16/038,556.
Notice of Allowance dated Aug. 15, 2016 in U.S. Appl. No. 13/041,964.
Notice of Allowance dated Nov. 22, 2021 in U.S. Appl. No. 16/673,203.
Office Action dated Jan. 24, 2012 in U.S. Appl. No. 13/041,964.
Office Action dated Jan. 25, 2012 in U.S. Appl. No. 13/249,982.
Office Action dated Mar. 23, 2016 in U.S. Appl. No. 13/249,982.
Office Action dated Apr. 6, 2020 in U.S. Appl. No. 16/673,203.
Office Action dated Apr. 29, 2021 in U.S. Appl. No. 16/673,203.
Office Action dated May 24, 2012 in U.S. Appl. No. 13/249,982.
Office Action dated Jul. 20, 2012 in U.S. Appl. No. 13/041,964.
Office Action dated Sep. 20, 2017 in U.S. Appl. No. 15/232,483.
Office Action dated Oct. 1, 2015 in U.S. Appl. No. 13/249,982.
Office Action dated Oct. 16, 2020 in U.S. Appl. No. 16/673,203.
Schwartz, "Xfinity Remote Prototype: iPad Demo at NCTA Show", May 12, 2010, pp. 1-2, available at: https://corporate.comcast.com/comcast-voices/xfinity-remote-prototype-ipad-demo-at-ncta-show.
TubeMote.com, "The Remote Control for the Web", Feb. 25, 2011, pp. 1-3, available at: http://tubemote.com.

* cited by examiner

NETWORK-BASED REMOTE CONTROL

CROSS-REFERENCE TO RELATED APPLICATIONS

This application is a continuation of U.S. patent application Ser. No. 16/673,203, filed Nov. 4, 2019, which is a continuation of U.S. patent application Ser. No. 16/038,556, filed Jul. 18, 2018, which is a continuation of U.S. patent application Ser. No. 15/232,483, filed Aug. 9, 2016, which is a continuation of U.S. patent application Ser. No. 13/041,964, filed Mar. 7, 2011, which claims the benefit of U.S. Provisional Application No. 61/411,386, filed Nov. 8, 2010, each of which is incorporated by reference herein in its entirety.

TECHNICAL FIELD

The disclosure relates to techniques for controlling networked devices.

BACKGROUND

Various computing devices may be used to control a home electronic device such as a television, personal computer, tablet computer, stereo, or other computing device capable of outputting audio and/or video content. Remote controls typically communicate directly with the device being controlled. For example, a user may actuate buttons on the remote control, which causes the remote control to transmit a signal directly to the device being controlled. The device interprets the received signal and performs a corresponding action (e.g., altering the content being played on the device). For instance, a user may use a remote control to change the channel of a television.

In one conventional solution, a user may control the playback of video on a television via a web application displayed on the television using a keyboard and mouse. In another conventional solution, the user may pair a device that acts as a remote control directly with the device outputting the audio and video (e.g., a television or stereo), such that the device outputting the audio and video acts as a server to the remote control by, for example, communicating directly with the remote control and accepting incoming connections from the remote control.

SUMMARY

In general, this disclosure is directed to techniques for exchanging information between a networked device, such as a network-enabled television, and web-enabled device, such as a remote control, via a network service (e.g., a "cloud service"). In an example, the web-enabled device can transmit control information via the network service to the networked device to control playback of media content (e.g., audio and/or video content) on the networked device. In another example, the networked device can transmit content information via the network service to the web-enabled device, such as status information concerning the networked device.

In one example, the disclosure is directed to an article of manufacture comprising a computer-readable storage medium encoded with instructions for causing one or more programmable processors of a computing device to receive, by a server, a first message from a remote control, wherein the first message includes a remote control identifier that uniquely identifies the remote control, and wherein the first message further includes control information for controlling one or more functions of at least one device other than the remote control. The instructions also cause on or more programmable processors of the computing device to retrieve, by the server, at least one controlled device identifier from a data repository based on the remote control identifier, wherein the at least one controlled device identifier uniquely identifies at least one controlled device that is distinct from and external to the server. The instructions also cause on or more programmable processors of the computing device to send a second message from the server to the at least one controlled device identified by the at least one controlled device identifier, wherein the second message includes the control information to control an operation of the at least one controlled device In another example, the disclosure is directed to a method that includes receiving a first message from a remote control, wherein the first message includes a remote control identifier that uniquely identifies the remote control, and wherein the first message further includes control information. The method also includes retrieving at least one controlled device identifier from a data repository based on the remote control identifier, wherein the at least one controlled device identifier uniquely identifies at least one controlled device. The method also includes sending a second message to the at least one controlled device identified by the at least one controlled device identifier, wherein the second message includes the control information to control an operation of the at least one controlled device.

In another example, a computing device includes one or more processors, a data repository configured to store data, a means for receiving a first message from a remote control, and a device management module. The first message received by the means includes a remote control identifier that uniquely identifies the remote control, and the first message further includes control information. The device management module retrieves at least one controlled device identifier from the data repository based on the remote control identifier, wherein the at least one controlled device identifier uniquely identifies at least one controlled device, and sends a second message to the at least one controlled device identified by the at least one controlled device identifier, wherein the second message includes the control information to control an operation of the at least one controlled device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
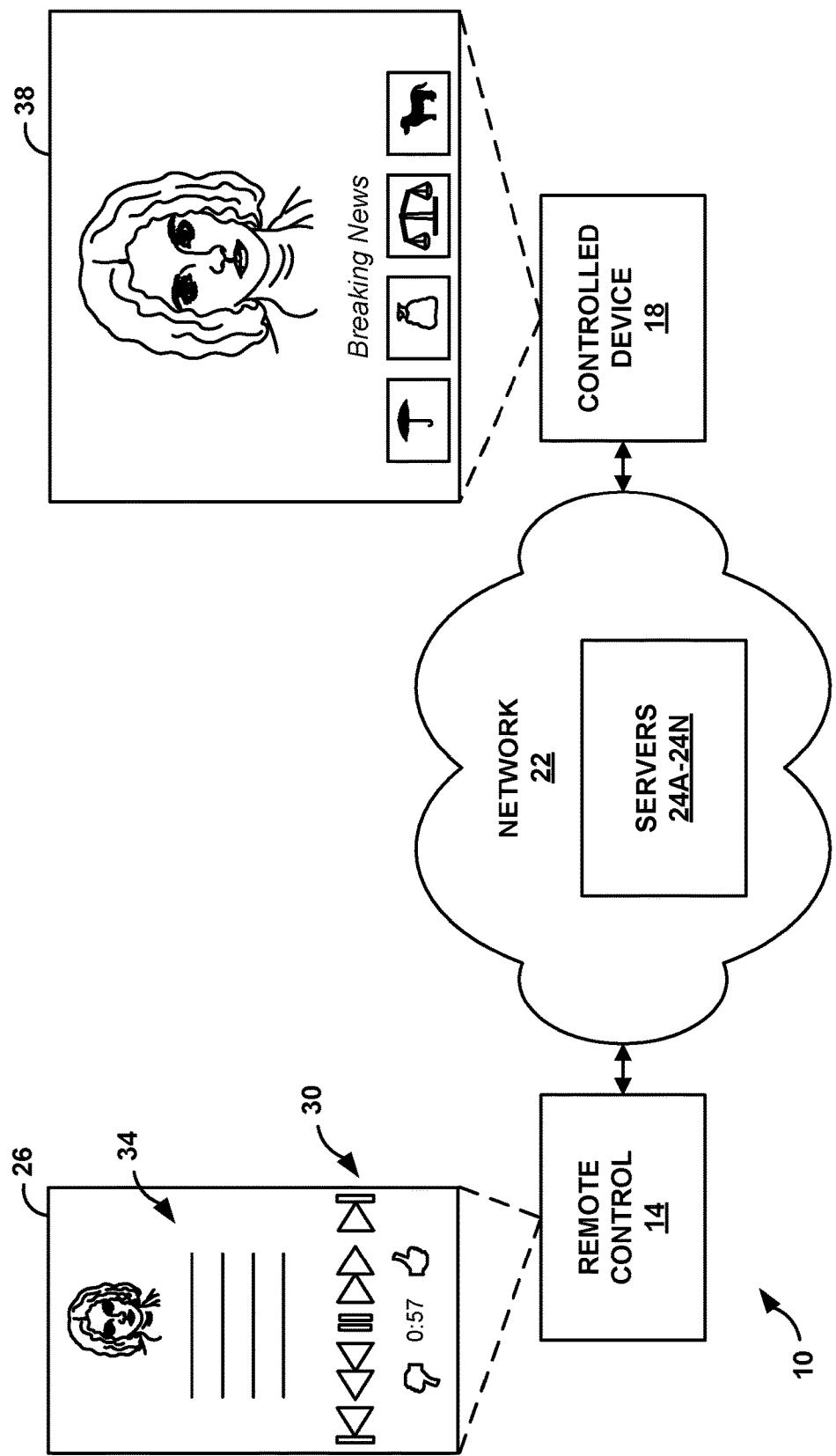
FIG. 1 is a block diagram illustrating an example networked environment with a remote control and controlled device, in accordance with one aspect of the present disclosure.

Techniques of this disclosure relate to a network service or "cloud service" that acts as an intermediary between a remote control device and a controlled device. For example, the network service may receive commands from a remote control and transmit the commands to a controlled device. The network service may also receive commands or other information from the controlled device and transmit those commands or other information to the remote control. The remote control may include a remote control application executing on a mobile device, such as a cellular telephone or a tablet computer. The controlled device may include any Internet-connected device capable of receiving commands, such as an Internet-connected television, a set top box, a personal video recorder, a gaming console, or other networked device. In one aspect, the remote control and the controlled device may operate as simple Hypertext Transfer Protocol HTTP clients of the network service. That is, the controlled device does not operate as a server to the remote control. Thus, any HTTP-enabled device may operate as a remote control or as a controlled device.

In general, the remote control and the controlled device are configured to both listen for messages from the network service and send messages to the network service. In some examples, the network service controls pairing one or more remote controls and one or more controlled devices, receives information or commands from remote controls and controlled devices, and sends information or commands to remote controls and controlled devices. The network service may direct received information and commands to the appropriate devices based on pairing information maintained by the network service. A remote control may be configured to send a message to a controlled device to perform a task, such as stopping playback of media content playing on the controlled devices or changing the media content playing on the controlled devices. To accomplish the task, the remote control first sends a message to the network service. The network service then determines the controlled device that is paired with the remote control and forwards the message to the appropriate controlled device. The controlled device receives the message from the network service and performs the task in response to receiving the message.

In addition, the controlled device may be configured to send a message to the remote control to notify the remote control of an event. For example, the controlled device may send a message to the remote control to notify the remote control device that playback of media content has completed. In this example, the controlled device sends a message to the network service. The network service determines the remote control that is paired with the controlled device and forwards the message to the remote control paired with the sending controlled device. The remote control receives the message and performs various actions in response to receiving the message. The remote control may, for example, update a user interface of the remote control or send a message to the controlled device to begin playback of another video.

According to some examples, the network service may assign each remote control and each controlled device a unique identifier. When pairing devices, the network service may utilize the unique identifier associated with each device to route communication signals properly. For example, the network service may initiate a session that includes each unique identifier of remote controls and controlled devices that are authorized to communicate with each other. The network service can then route messages to members of the session. Any number of remote controls may be paired with a single controlled device and one remote control may be paired to any number of controlled devices. When pairing multiple remote controls and multiple controlled devices associated with a single user, the user may identify a subset of the remote controls as paired to a subset of the controlled devices, and manage which remote controls control which controlled devices.

Remote controls and controlled devices may be paired using any one of several different techniques. As one example, a user may maintain a user account using the network service, and the remote controls and controlled devices may be associated with the user account. For example, upon connecting to a network service, the remote controls and controlled devices may notify the network service that the remote controls and controlled devices are connected to the network. The network service may, in some examples, determine whether the remote controls and controlled devices are authorized to be associated with the user account. If authorized, the network service initiates a session and assigns the remote controls and controlled devices unique identification numbers. The network service uses the unique identification numbers for pairing during a session. In another example, a user may be presented with a quick response ("QR") code via the controlled device that the user scans with the remote control (e.g., using a camera of the remote control). The QR code identifies a user account or previously initiated session maintained by the network service. Upon scanning the QR code, the remote control may send a message to the network service indicating that the network service should assign a unique identification number to the remote control and pair the remote control with the user account or session identified by the QR code.

In this manner, one or more remote controls may control one or more controlled devices via the network service. Using the network service to transmit and receive messages between a remote control and a controlled device may enable non-traditional devices having rich input and display capabilities to act as a remote control. In addition, by using the network service as an intermediary, the remote control and the controlled device, in various instances, may not need to be connected to the same local area network, nor in physical proximity to each other. The network service may also enable pairing of a nearly limitless number of remote controls and controlled devices.

FIG. 1 is a block diagram illustrating an example networked environment 10 with a remote control 14 and controlled device 18, in accordance with one aspect of the present disclosure. According to an aspect of the disclosure, remote control 14 communicates with controlled device 18 via network 22 and servers 24A-24N (collectively "servers 24") in network 22. As shown in FIG. 1, according to some examples, remote control 14, controlled device 18, and servers 24 may be distinct components (e.g., physically distinct).

According to an aspect of the disclosure, remote control 14 is a web-enabled cellular phone. Other examples of the remote control 14 include, but are not limited to, portable or mobile devices such as cellular phones or other wireless communication devices, personal digital assistants (PDAs), laptop computers, tablets, portable gaming devices, portable media players, e-book readers, watches, as well as non-portable devices such as desktop computers. For purposes of illustration only in this disclosure, remote control 14 is described as a portable or mobile device that a user can carry, but aspects of this disclosure should not be considered limited to portable or mobile devices.

Remote control 14 may be configured to transmit signals to and receive signals from network 22. In some examples, remote control 14 is configured to initiate contact with servers 24. For example, remote control 14 may notify servers 24 that remote control 14 is connected to network 22. Remote control 14 may notify servers 24, for example, automatically upon being powered on. In another example, a user may log in to a user account maintained by the servers 24 using remote control 14, thereby notifying servers 24 that remote control 14 is connected to network 22. Remote control 14 may also be configured to transmit a message to servers 24 of network 22 that identifies remote control 14, which can be used by servers 24 to pair remote control 14 with controlled device 18. The message may also contain control information for controlling one or more functions of controlled device 18.

In the example shown in FIG. 1, remote control 14 includes a user interface 26 that may be used to present information to a user. For example, user interface 26 may display controls 30 and information 34 associated with content being played on controlled device 18. Controls 30 may depend on the capability of remote control 14 or controlled device 18, and include, for example, fast forward, reverse, skip ahead or back, play, stop, move to new content, etc. The type and quantity of information 34 may also depend on the capability of remote control 14 and controlled device 18, and include, for example, playback information such as time remaining of content, playlist information, content rating information, etc.).

Controlled device 18 may include a variety of network-enabled devices, such as a network enabled television, set top box, personal video recorder, or other device capable of being network-connected and controlled remotely. In an example, controlled device 18 is an Internet-connected television that is configured to receive signals from and transmit signals to network 14. For example, controlled device 18 may be configured to initiate contact with servers 24. For example, controlled device 18 may notify servers 24 that controlled device 18 is connected to network 22. Controlled device 18 may notify servers 24, for example, automatically upon being powered on. In another example, a user may log in to a user account maintained by the servers 24 using controlled device 18, thereby notifying servers 24 that controlled device 18 is connected to network 22. Controlled device 18 can also be configured to transmit a message to servers 24 of network 22 that identifies controlled device 18, which can be used by servers 24 to pair controlled device 18 with remote control 14. The message may also contain notification or content data for updating a user interface of remote control (e.g., indicating completion of a task, such as completing playback of content).

As shown in FIG. 1, controlled device 18 may include a display 38 for displaying content to a user. In some examples, controlled device 18 receives one or more messages from remote control 14 via network 22 and servers 24 to alter the content that is rendered on display 38 of controlled device 18. In another example, controlled device 18 transmits a message to remote control 14 via network 22 and servers 24 to notify the user of remote control 14 that playback of content has been completed. Other messages can also be transmitted between controlled device 18 and remote control 14 via network 22 and servers 24. For example, controlled device 18 may transmit content information such as a preview of the content that is being displayed on controlled device 18, a playlist of future content to be displayed on controlled device 18, rating information associated with the content being displayed on controlled device 18, or the like.

As shown in FIG. 1, network 22 and servers 24 are connected to remote control 14 and controlled device 18. Network 22 may be connected to remote control 14 and controlled device 18 via wired and/or wireless links. For example, remote control 14 and controlled device 18 may be coupled to network 22 via a combination of any wireless or wired communication medium, such as a radio frequency (RF) spectrum or one or more physical transmission lines, or any combination of wireless and wired media. The links may form part of a packet-based network, such as a local area network, a wide-area network, or a global network such as the Internet. The links generally represent any suitable communication medium, or collection of different communication media, for transmitting signals from remote control 14 to network 22 and from controlled device 18 to network 22, including any suitable combination of wired or wireless media. The links may include routers, switches, base stations, or any other equipment that may be useful to facilitate communication from remote control 14 and controlled device 18 to network 22.

Network 22 may include a wide-area network such as the Internet, a local-area network (LAN), an enterprise network, or one or more other types of networks. Servers 24 may be any of several different types of network devices. For instance, servers 24 may be conventional web servers, specialized media servers, personal computers operating in a peer-to-peer fashion, or other types of network devices. As described in greater detail with respect to FIG. 5, in some examples, servers 24 include one or more data repositories or databases for storing information, such as identification numbers, session identifiers, and any other information required to carry out data transfer between remote control 14 and controlled device 18. In some examples, the data repositories of servers 24 may be structured as one or more tables, database systems, linked lists, radix trees, or other suitable data structure.

According to an aspect of the disclosure, network 22 and servers 24 facilitate an exchange of data between remote control 14 and controlled device 18. For example, servers 24 associated with network 22 may operate as an intermediary between remote control 14 and controlled device 18 to relay data between remote control 14 and controlled device 18. In some examples, servers 24 "pair" remote control 14 and controlled device 18 such that information and commands from remote control 14 can be transmitted to controlled device 18, and information and commands can be transmitted from controlled device 18 to remote control 14. For example, remote control 14 and controlled device 18 may initially notify servers 24 that remote control 14 and controlled device 18 are connected to network 22 and available for pairing. In some examples, servers 24 authenticate that remote control 14 and controlled device 18 are permitted to be paired. For example, servers 24 may maintain a user account that includes permissions for remote control 14 and controlled device 18, which allows remote control 14 and controlled device 18 to be paired. In some examples, the authorization of remote control 14 and controlled device 18 utilizes HTTP header information to identify remote control 14 and controlled device 18 as being associated with the user account. Servers 24 may assign unique identification numbers to each authorized remote control 14 and controlled device 18 connected to network 22. To pair remote control 14 and controlled device 18, servers 24 may create a session that includes all of the issued unique identification numbers.

After adding remote control 14 and controlled device 18 to the session, messages generated by remote control 14 and controlled device 18 include their unique identification numbers, so that the servers 24 recognize remote control 14 and controlled device 18 as being included in the session. Servers 24 receive messages from remote control 14 and controlled device 18 and route the messages to other members of the session. For example, a user may actuate one of controls 30 of remote control 14 to alter the content displayed on display 38 of controlled device 18. Remote control 14 transmits a control message that includes the unique identifier of remote control 14 to servers 24 via network 22. Servers 24 identify that remote control 14 is a member of a session based on the unique identification number of remote control 14. Servers 24 then routes the control message to controlled device 18, which is also a member of the session. Controlled device 18 receives the control message and performs the appropriate action.

Alternatively or additionally, controlled device 18 transmits information (e.g., data for updating content information 34 displayed on remote control 14) that includes the unique identifier of controlled device 18 to servers 24 via network 22. Servers 24 identify that controlled device 18 is a member of the session based on the unique identification number of controlled device 18. A server then routes the information to remote control 14, which is also a member of the session. Remote control 14 then receives the information and updates user interface 26 and information 34 according to the received information.

Figure 2:
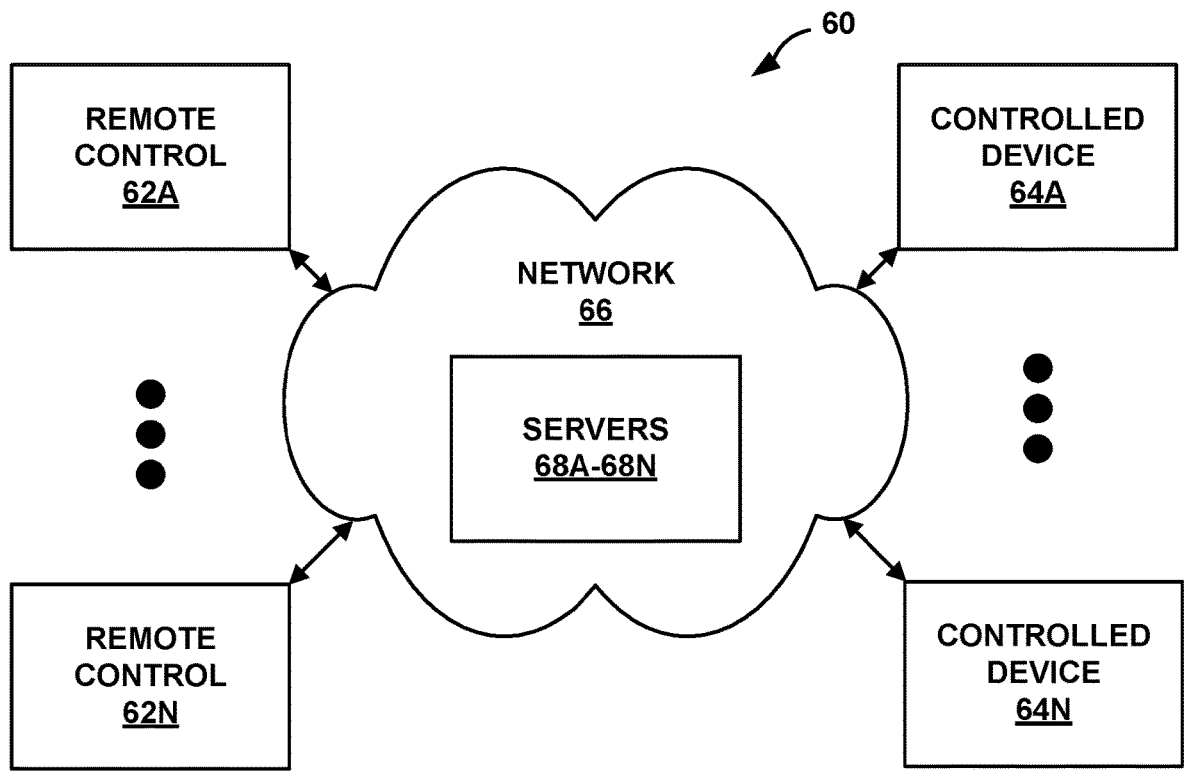
FIG. 2 is a block diagram illustrating an example networked environment having remote controls and controlled devices, in accordance with one aspect of the present disclosure.

FIG. 2 is a block diagram illustrating an example networked environment 60 having remote controls 62A-62N (collectively, "remote controls 62") and controlled devices 64A-64N (collectively, "controlled devices 64") connected via network 66 and servers 68A-68N (collectively, "servers 68"), in accordance with one aspect of the present disclosure. In some examples, remote controls 62, controlled devices 64, network 66, and servers 68 may be configured similarly to, or the same as remote control 14, controlled device 18, network 22, and servers 24, respectively, shown in FIG. 1. Remote controls 62 and controlled devices 64 shown in FIG. 2 need not be configured in precisely the same way. For example, each remote control of remote controls 62 may be a different make or model of web-enabled mobile phone, according to one or more non-limiting examples. In addition, each of the controlled devices of controlled devices 64 may be a different make or model network-compatible television, according to one or more non-limiting examples.

Servers 68 of network 66 may be responsible for initiating sessions and enabling pairing any of remote controls 62 with any of controlled devices 64. For example, servers 68 of network 66 may assign a unique identifier to each of the remote controls 62 and to each of the controlled devices 64. As described in more detail with respect to FIG. 5, servers 68 can utilize the unique identifiers to enable communication between the remote controls 62 and controlled devices 64.

Any number of remote controls 62 may be paired with a single controlled device from the controlled devices 64. In addition, a single remote control of the remote controls 62 may be paired with any number of the controlled devices 64. When pairing multiple remote controls 62 and multiple controlled devices 64 associated with a single user, the user may manage permissions of the remote controls 62 and controlled devices 64. For example, a user may identify a subset of the remote controls 62 as being paired with a subset of the controlled devices 64.

Remote controls 62 and controlled devices 64 may be paired using a variety of techniques. In some examples, servers 68 may generate a session and pair any remote controls 62 and controlled devices 64 associated with the session. For example, servers 68 may issue each of remote controls 62 and controlled devices 64 connected to servers 68 unique identification numbers, and associate those assigned unique identification numbers as being members of the session. Remote controls 62 and controlled devices 64 include their unique identification numbers in messages sent to servers 68, and servers pair the device sending the message with other members of the session.

In other examples, remote controls 62 and controlled devices 64 may be individually added to a session maintained by servers 68. For example, a controlled device, such as controlled device 64A may present a user with a QR code that identifies a session that has been created by servers 68. The user may scan the QR code with one of remote controls 62 (e.g., remote control 62A). Upon scanning the QR code, remote control 62A transmits a message to servers 68 requesting that servers 68 issue remote control 62A a unique identification number and add remote control 62A to the session associated with the QR code, thereby pairing remote control 62A with controlled device 64A.

In some examples, more than one user of more than one of the remote controls 62 may be paired with a single controlled device, such as controlled device 64A. For example, more than one user of more than one of the remote controls 62 may scan the same QR code displayed on controlled device 64A. In such examples, servers 68 pair each of the remote controls 62 with controlled device 64A by issuing each of remote controls 62 a unique identification number and adding remote controls 62 to the session, thereby allowing control messages to be sent from remote controls 62 to controlled device 64A. Controlled device 64A can also send information (e.g., information to updates user interfaces of remote controls 62) to all of the paired remote controls 62 (e.g., all remote controls 62 that are members of the same session as controlled device 64A) via servers 68.

A remote control, such as remote control 62A may also be paired with more than one of the controlled devices 64 via servers 68. For example, a user may log into a user account maintained on servers 68 to associate devices (e.g., any of remote controls 62 or controlled devices 64) with the user account. The user may then identify remote controls 62 as remote control devices and controlled devices 64 as controlled devices, and servers 68 can pair the devices according to the user's preferences.

Figure 3:
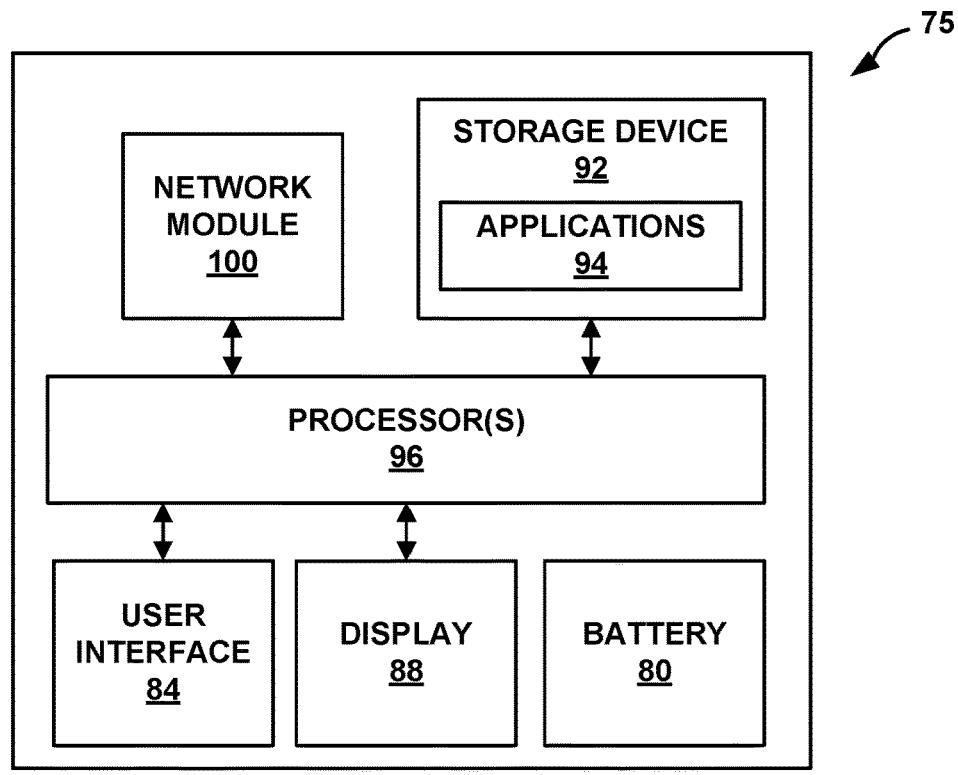
FIG. 3 is a block diagram illustrating an example remote control, which may be an example of the remote control shown in FIG. 1 or one of the remote controls shown in FIG. 2, in accordance with one aspect of the present disclosure.

FIG. 3 is a block diagram illustrating an example remote control 75, which may be an example of, or the same as, remote control 14 shown in FIG. 1 or one of remote controls 62 shown in FIG. 2. Remote control 75 may include battery 80, user interface 84, display 88, storage device 92 having one or more applications 94, one or more processors 96, and network module 100. Other implementations of remote control 75 are possible, having more or fewer components than those shown in FIG. 3. For example, in examples where remote control 75 is a cellular phone or other wireless communication device, remote control 75 includes a microphone and speaker for voice communication.

Battery 80 provides power for the various units of remote control 75, and may be rechargeable. Examples of battery 80 include a lithium polymer battery, a lithium ion battery, nickel cadmium battery, and a nickel metal hydride battery. User interface 84 allows a user of remote control 14 to interact with remote control 75. Examples of user interface 84 include a keypad embedded on device 84, a touch screen, a keyboard, a mouse, a roller ball, buttons, or other devices that allow a user to interact with remote control 75. In some examples, user interface 84 may include a microphone to allow a user to provide voice commands. In some examples, user interface 84 generates a graphical user interface that allows a user to initiate commands. For example, user interface 84 may include a software module that generates a graphical user interface that is displayed on display 88.

Display 88 may include one of a variety of display devices such as a liquid crystal display (LCD), an e-ink display, a cathode ray tube (CRT), a plasma display, an organic light emitting diode (OLED) display, or another type of display. Display 88 presents the content generated by remote control 75 (e.g., user interface 84 of remote control 75) to a user of remote control 75. For example, display 88 may present applications executed on remote control 75 such as a remote control application, a web browser, content retrieved from servers, and other functions that may need to be presented to the user. In some examples, display 88 may provide some or all of the functionality of user interface 84. For example, display 88 may be a touch screen that allows a user to interact with remote control 75.

Storage device 92 stores instructions for applications 94 that may be executed by one or more processors 96. For purposes of illustration only, in the following description applications 94 that may be executed by one or more processors 96 are described below as being executed by one processor 96. Applications 94 may be downloaded by a user via a network (e.g., downloaded from one or more of servers 24 via network 22 as shown in FIG. 1) or may be preprogrammed within remote control 75. Applications 94 may be executed by processor 96 in response to a user interacting with remote control 75 to execute the applications 94. Applications 94 may also be executed by processor 96 when a user turns on remote control 75.

Storage device 92 may also include instructions that cause processor 96 to perform various functions ascribed to processor 96 in this disclosure. Storage device 92 may comprise a computer-readable, machine-readable, or processor-readable storage medium that comprises instructions that cause one or more processors, e.g., processor 96, to perform various functions. Storage device 92 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. In some embodiments, storage device 92 may comprise one or more of a non-transitory/tangible storage media, where the data stored in such media may or may not change (e.g., ROM, RAM).

A user may interact with user interface 84 and/or display 88 to execute one or more applications 94 stored on storage device 92. Some applications may be executed automatically by remote control 75, such as when remote control 75 is powered on or booted up. In response, processor 96 executes the one or more applications 94 selected by a user, or executes the one or more applications 94 executed by remote control 75. Processor 96 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 96, in this disclosure, may be embodied as software, firmware, hardware or any combination thereof.

Processor 96 may execute one or more of applications 94 either alone or simultaneously. Examples of applications 94 include a remote control application, web browsers, e-mail, programs to retrieve stock quotes, programs to search for restaurants, programs that retrieve current and future weather information, games, a program to search the Internet, a program that provides news, a program that provides maps, and other programs executed by processor 96. Applications 94 may be executed based on a request from a user, and may be terminated based on a request from a user. Some applications 94 may be running continuously in the background. Some applications 94 may be executed automatically by remote control 75 such as at power up and may be terminated automatically by remote control 75 such as at power down.

Figure 5:
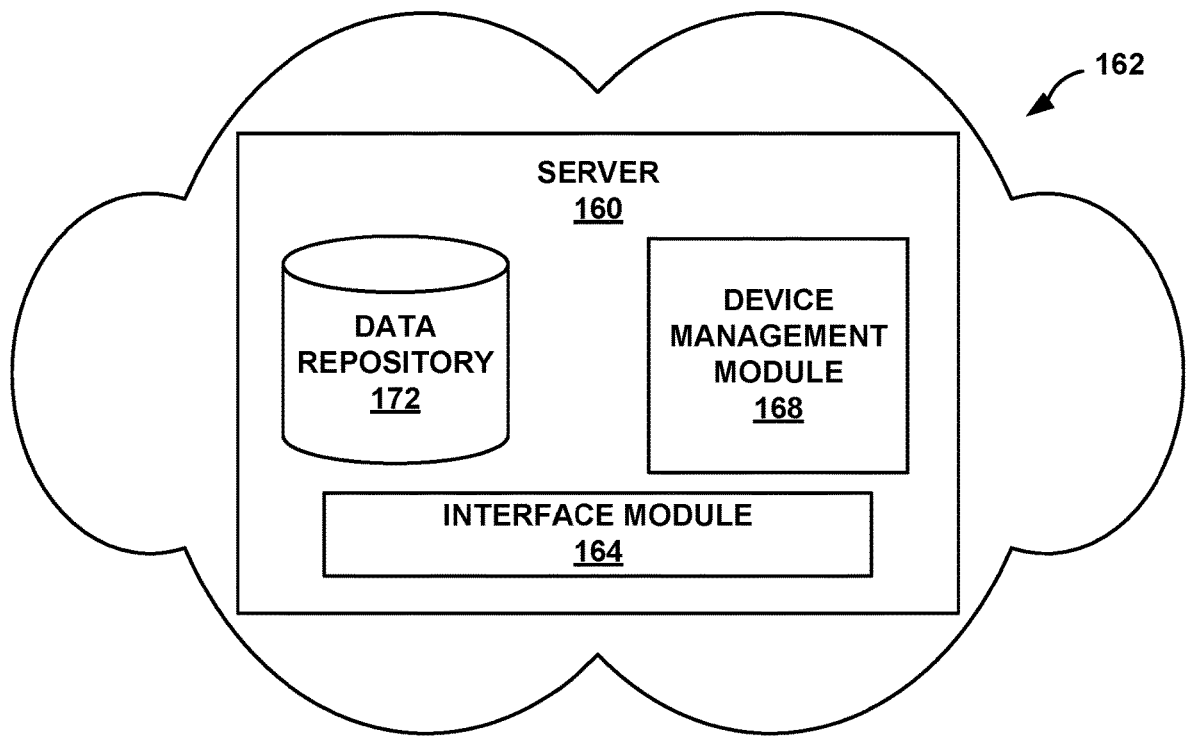
FIG. 5 is a block diagram illustrating an example server, which may be an example of the server shown in FIG. 1, or included within the network shown in FIG. 2, in accordance with one aspect of the present disclosure.

One or more applications 94 executed by processor 96 may require data from one or more of servers (e.g., such as servers 24 shown in FIG. 5). Network module 100 may transmit data/requests to and receive data/responses from one or more servers via a network (such as network 22 shown in FIG. 1). Network module 100 may also provide received data to processor 96 for further processing. Network module 100 may support wireless or wired communication, and includes appropriate hardware and software to provide wireless or wired communication. For example, network module 100 may include an antenna, modulators, demodulators, amplifiers, and other circuitry to effectuate communication between remote control 75 and one or more servers associated with a network. Network module 100 may communicate with one or more servers associated with a network according to a network communication protocol, such as, for example, hypertext transfer protocol (HTTP), HTTP secured by transport layer security or secure sockets layer (HTTPS), simple mail transfer protocol (SMTP), simple object access protocol (SOAP), or other communication protocols.

Remote control 75 may include a remote control application (e.g., a remote control application stored with applications 94 stored in storage device 92) that allows a user to initiate commands being sent to a controlled device, such as controlled device 18 shown in FIG. 1. A user may interact with user interface 84 and/or display 88 to execute the remote control application. Processor 96 then executes the remote control application and causes display 88 to display a remote control application user interface to the user. In another example, a remote control application may be stored on one or more servers on a network and be accessible via the network. For example, a user may interact with user interface 84 and/or display 88 to execute a web browser. Processor 96 then executes the web browser application and causes display 88 to display a web browser to the user. The user may then interact with user interface 84 and/or display 88 to utilize a website containing remote control application content.

A user may use the remote control application of remote control 75, for example, to initiate contact with a server, such as server 24, for pairing remote control 75 to one or more controlled devices, such as controlled device 18 shown in FIG. 1. In some examples, the user may also utilize the remote control application of remote control 75 to select one or more previously paired controlled devices, and to send control messages to one or more paired controlled devices. For example, the user may interact with user interface 84 and/or display 88 to interact with and control any available controlled devices.

Figure 4:
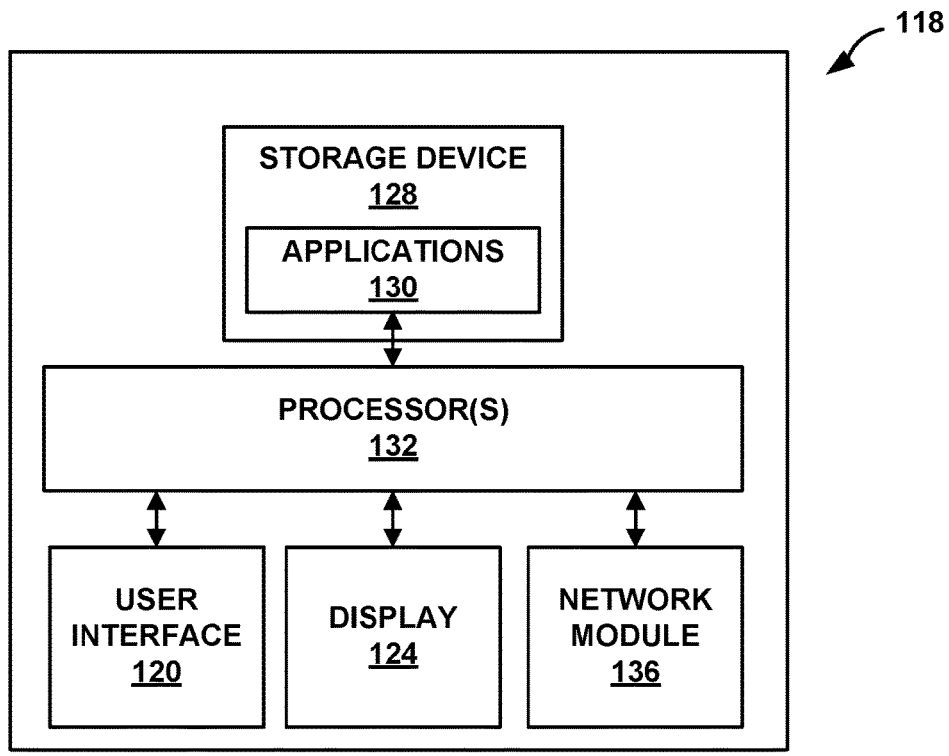
FIG. 4 is a block diagram illustrating an example controlled device, which may be an example of the controlled device shown in FIG. 1 or one of the controlled devices shown in FIG. 2, in accordance with one aspect of the present disclosure.

FIG. 4 is a block diagram illustrating an example controlled device 118, which may be an example of, or the same as controlled device 18 shown in FIG. 1 or one of controlled devices 64 shown in FIG. 2. According to one example of the present disclosure, controlled device 118 includes user interface 120, display 124, storage device 128, one or more processors 132, and network module 136. Other example implementations of controlled device 118 are possible, having more or fewer components than those shown in FIG. 4. For example, controlled device 118 may be a personal computer having additional components (e.g., an optical drive, a camera, etc.). In another example, controlled device 118 may be a personal media player having fewer components than those shown in FIG. 4 (e.g., a personal media player that lacks a display).

User interface 120 allows a user of controlled device 118 to interact with controlled device 118. Examples of user interface 120 include an embedded keypad or other buttons. The user interface 120 may also include a detachable or otherwise independent device, such as a traditional remote control device having a keypad, a keyboard, a mouse, a roller ball, buttons, or other devices that allow a user to interact with controlled device 18. A user may utilize user interface 120 to control media content being presented by controlled device 118 (e.g., audio or video content). In an example, a user may utilize user interface 120 to navigate to a web page on the Internet in order to display the content hosted by the web page (e.g., YouTube®, Hulu®, Netflix®, other subscription or non subscription based video content).

Display 124 may comprise a variety of display devices such as a liquid crystal display (LCD), an e-ink display, a cathode ray tube (CRT), a plasma display, an organic light emitting diode (OLED) display, or another type of display device. Display 124 presents content to a user of controlled device 118. For example, display 124 may be configured to present audio and/or video content from a cable service provider, a satellite television provider, content accessible via the World Wide Web, or other content providers.

Although controlled device 118 is shown as including display 124, aspects of this disclosure should not be considered limited to examples that include display 124. In some examples of controlled device 118, display 124 may be optional. For example, if controlled device comprises a web-enabled music player or a radio, controlled device 118 may not include display 124. In other examples, controlled device 118 may include an external, independent display. For example, controlled device 118 may be configured as a set top box or other component that is connectable to a display.

Storage device 128 stores instructions for applications 130 that may be executed by one or more processors 132 associated with controlled device 118. For purposes of illustration only in the following description, applications 130 that may be executed by one or more processors 132 are described below as being executed by one processor 132. Applications 130 may be pre installed by a manufacturer of controlled device 118, or may be downloaded by a user from a server via a network, such as servers 24 and network 22 shown in FIG. 1. Applications 130 may be executed by processor 132 in response to a user interacting with controlled device 118 to execute the applications 130.

Storage device 128 may also include instructions that cause processor 132 to perform various functions ascribed to processor 132 in this disclosure. Storage device 132 may comprise a computer-readable, machine-readable, or processor-readable storage medium that comprises instructions that cause one or more processors, e.g., processor 132, to perform various functions. Storage device 132 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. In some embodiments, storage device 132 may comprise one or more of a non-transitory/tangible storage media, where the data stored in such media may or may not change (e.g., ROM, RAM).

A user may interact with user interface 120 and/or display 124 to execute one or more of applications 130 stored on storage device 128. Some applications 130 may be executed automatically by controlled device 118 such as when controlled device 118 is turned on or booted up. In response, processor 132 executes the one or more applications 130 selected by a user, or executes the one or more applications 130 executed by controlled device 118. Processor 132 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 132, in this disclosure, may be embodied as software, firmware, hardware or any combination thereof.

Processor 132 may execute one or more of applications 130 either alone or simultaneously. Examples of applications 130 include an application for displaying television content provided by a satellite or cable provider, an application for displaying content hosted on the World Wide Web, a web browser application, a social networking application, an e-mail application, programs to retrieve stock quotes, programs to search for restaurants, programs that retrieve current and future weather information, games, a program to search the Internet, a program that provides news, a program that provides maps, and other programs executed by processor 132. Applications 130 may be executed based on a request from a user, and may be terminated based on a request from a user. Some applications 130 may be running continuously in the background. Some applications 130 may be executed automatically by controlled device 118 such as at power up and may be terminated automatically by controlled device 118 such as at power down.

In some examples, any application of applications 130 executed by processor 132 may require data from one or more of servers, such as servers 24 shown in FIG. 1. Network module 136 is configured to transmit data/requests to and receive data/responses from one or more servers via network. Network module 136 may provide received data to processor 132 for further processing. Network module 136 may support wireless or wired communication, and includes appropriate hardware and software to provide wireless or wired communication. For example, network module 136 may include an antenna, modulators, demodulators, amplifiers, and other circuitry to effectuate communication between controlled device 118 and one or more servers associated with a network. Network module may 100 may communicate with one or more servers associated with the network according to a network communication protocol, such as, for example, hypertext transfer protocol (HTTP), HTTP secured by transport layer security or secure sockets layer (HTTPS), simple mail transfer protocol (SMTP), simple object access protocol (SOAP), or other communication protocols.

Controlled device 118 may be used, in some examples, in conjunction with a remote control, such as remote control 14 shown in FIG. 1, remote controls 62 shown in FIG. 2, or remote control 75 shown in FIG. 3. For example, storage device 92 may store application instructions associated with a video application or web browser for displaying video content from the World Wide Web (e.g., YouTube® content, Hulu® content, Netflix® content, etc.). A user may interact with user interface 120 to execute the video or web browser application. Processor 120 then executes the video or web browser application and causes display 124 to display content to the user.

A user may utilize the video application of applications 130 or web browser of controlled device 118 to facilitate pairing of controlled device 118 to one or more remote controls, such as remote control 14 shown in FIG. 1. For example, controlled device 118 may notify a server, such as sever 24 shown in FIG. 1, that it is available to be joined to a session maintained by server 24 upon powering on or executing a video or web browser application. In other examples, a controlled device 118 may provide an interface that allows a user to authorize one or more remote controls to send commands to controlled device 118 via a network. Additionally or alternatively, controlled device 118 may display a QR code using display 124 that can be scanned by a remote control. After scanning the QR code displayed using display 124 with the remote control, the remote control may be authorized to send control signals to controlled device 118 via the network.

FIG. 5 is a block diagram illustrating an example server 160 associated with network 162, which may be an example of servers 24 of network 22 shown in FIG. 1, or servers 68 of network 66 shown in FIG. 2, in accordance with one aspect of the present disclosure. While described herein in relation to servers 68 of FIG. 2, server 160 may also be implemented in a variety of other network environments having components other than those shown in FIG. 2. As shown in FIG. 5, server 160 may be comprised as a single unit with an interface module 164, a device management module 168, and a data repository 172. While shown as a single unit in FIG. 5, in other implementations, hardware and functions associated with server 160 may be spread among more than one server unit. In addition, sever 160 may include more modules shown in FIG. 5.

Interface module 164 is configured to accept signals being received by the server 160 and transmit signals being transmitted by server 160. In some examples, input and output network interfaces of the interface module 164 may be functionally integrated, while in other examples, input and output interfaces may be separate interfaces of interface module 164. For example, network interfaces of interface module 164 may include one or more network interface cards (NICs) configured to communicate over, for example, Ethernet, Transmission Control Protocol (TCP), Internet protocol (IP), Asynchronous Transfer Mode (ATM), or other network communication protocols. In some examples, server 160 may include a plurality of either or both input and output interfaces.

Data repository 172 stores information such as user information, session information, unique identifier numbers, and any other information required to carry out data transfer between remote control 14 and controlled device 18. In some examples, an entry within data repository 172 includes a unique identification number that has been assigned to a remote control or controlled device. Alternatively or additionally, an entry within data repository 172 may identify an association between a remote control and a controlled device. In some examples, data repository 172 may also be configured to store data from past sessions between remote control 14 and controlled device 18. In some examples, data repository 172 may be structured as one or more tables, database systems, linked lists, radix trees, or other suitable data structure.

Device management module 168 generates messages, as well as controls messages being received from and messages being transmitted to remote controls 62 and controlled devices 64 of FIG. 2. In some examples, device management module 168 receives messages from remote controls 62 and controlled devices 64 notifying device management module 168 that the devices are available for pairing. Device management module 168 may authorize devices according to permissions set by a user having a user account. After providing authorization, device management module 168 may generate an identification message to aid device management module 168 in managing a session. In the example of one of remote controls 62, such as remote control 62A, requesting authorization to join a session maintained by device management module 168, device management module 168 assigns remote control 62A a unique session identification number (SID). Device management module 168 may also store the SID associated with remote control 62A in data repository 172, and return the SID to remote control 62A. Device management module 168 may also generate and store unique SIDs for controlled devices 64 in a similar manner. For example, device management module 168 may assign each connected controlled device 64 that requests authorization to join a session maintained by device management module with a unique SID which the controlled devices 64 can then use to identify itself in future communications.

After assigning SIDs to connected devices, device management module 168 can manage messages between remote controls 62 and controlled devices 64. For example, device management module 168 may receive a message containing an SID and control information from one of remote controls 62, such as remote control 62A, for controlling on or more controlled devices 64. Device management module 168 then identifies the session that includes the SID of remote control 62A and determines the intended recipient(s) (e.g., one or more controlled devices 64) based on the other members of the session that have been assigned SIDs. That is, device management module 168 queries data repository 172 to determine the SIDs of all devices included in the session. After determining which controlled devices 64 are associated with the session, device management module 168 transmits the control information to the intended controlled devices 64. In some examples, device management module 168 transmits the control information to all devices having SIDs that are associated with the session. Devices receiving the control information that are not configured to execute the control information (e.g., other remote controls 62 of the session) can ignore the message. In other examples, device management module 168 determines which SIDs of the session are associated with controlled devices 64, and transmits the control information to only the controlled devices 64. The control messages can be used by the controlled devices 64 to alter playback of content of controlled devices 64.

Device management module 168 may also control messages being transmitted from controlled devices 64 to remote controls 62. For example, after assigning SIDs to connected devices, device management module 168 may be configured to receive a message containing an SID from a controlled device, such as controlled device 64A, as well as content information for updating a user interface associated with one or more connected remote controls 62. Device management module 168 then identifies the session that includes the SID of controlled device 64A and determines the indented recipient(s) (e.g., one or more remote controls 62) based on the other members of the session that have been assigned SIDs. That is, device management module 168 queries data repository 172 to determine the SIDs of all devices included in the session. After determining which remote controls 62 are associated with the session, device management module 168 transmits the content information to the intended remote controls. In some examples, device management module 168 transmits the content information to all devices having SIDs that are associated with the session. Devices receiving the content information that are not configured to execute the content information (e.g., other controlled devices 64 of the session) can ignore the message. In other examples, device management module 168 determines which SIDs of the session are associated with remote controls 62, and transmits the content information to only the remote controls 62. The content information may be used by the remote controls 62 to update a user interface of remote controls 62 or update playlist information of remote controls 62.

According to some aspects of the disclosure, device management module 168 carries out the routing of information between remote controls 62 and controlled devices by "pairing" the remote controls 62 and controlled devices 64 using the identification numbers described above. In some examples, device management module 168 pairs all authorized devices that have been issued an SID. In other examples, device management module 168 identifies and stores associations of remote controls 62 and controlled devices 64 to facilitate repeat communication between remote controls 62 and controlled devices 64. Device management module 168 may pair devices in a variety of ways including, for example, utilizing QR codes or allowing a user to manage pairing via a user interface.

In some examples, device management module 168 may utilize a QR code to facilitate a device joining a session and being paired with other devices of the session. For example, device management module 168 may generate a unique session identification number that identifies a session. Upon scanning the QR code (e.g., the QR code being displayed on one or more of controlled devices 64), a remote control, such as remote control 62A, transmits a message to device management module 168 to request that remote control 62A be included in the session identified in the QR code. In some examples, device management module 168 then authorizes remote control 62A, issues remote control 62A an SID, and adds the SID to the session. The process can be repeated by other remote controls 62, such that device management module pairs multiple remote controls 62 with controlled device 64A, thereby allowing controlled device 64A to receive commands from multiple remote controls 62.

In other examples, a user may access a user account stored, for example, in data repository 172 to enable device management module 168 to pair remote controls 62 and controlled devices 64. For example, a user may log into a user account maintained on server 160 to associate devices (e.g., any of remote controls 62 or controlled devices 64) with the user account. Unique identification numbers for each device may be stored, for example, in data repository 172. The user may then identify remote controls 62 as remote control devices and controlled devices 64 as controlled devices, and device management module 168 can pair the devices according to the user's preferences. After pairing, device management module 168 can facilitate communication between remote controls 62 and controlled devices 64.

According to some aspects of the disclosure, remote controls 62 and controlled devices 64 are HTTP clients of server 160. That is, server 160 is configured to receive and transmit messages according to HTTP protocol. In other examples, however, server 160 may be configured to receive and transmit messages according to other protocols, such as Extensible Messaging and Presence Protocol (XMPP) or Remote Procedure Call (RPC) protocol.

Figure 6:
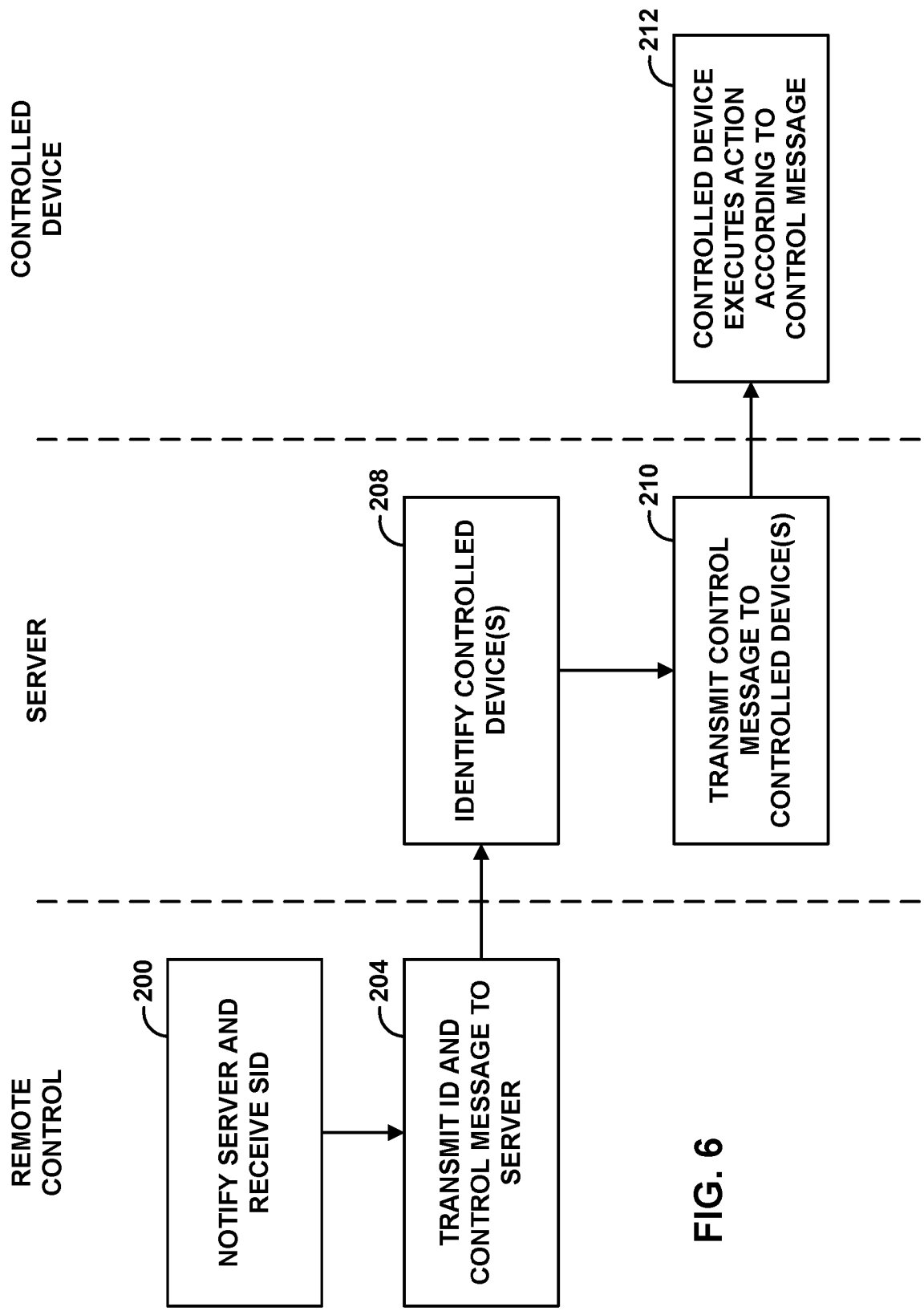
FIG. 6 is a flowchart illustrating an example operation of a remote control communicating with a network server, in accordance with one aspect of the present disclosure.

FIG. 6 is a flowchart illustrating an example operation of a remote control communicating with a network server, in accordance with one aspect of the present disclosure. For purposes of illustration only, the method of FIG. 6 is described with respect to networked environment 10 of FIG. 1, though various other systems and/or devices may be utilized to implement or perform the method shown in FIG. 6.

According to some examples, remote control 14 notifies servers 24 that remote control is connected to network 22, and servers 24 assign remote control 14 a remote control identifier (e.g., a unique SID) (200). Remote control 14 may notify servers 24, for example, automatically upon being powered on. In another example, a user may log in to a user account maintained by the servers 24 using a remote control application on remote control 14, thereby notifying servers 24 that remote control 14 is connected to network 22. In another example, remote control 14 may notify servers 24 that it is connected to network 22 and request an SID by, for example, scanning a QR code displayed on controlled device 18. The QR code may be associated with a user account or active session, and severs 24 may assign remote control 14 an SID associated with the user account or session. In some examples, prior to assigning remote control 14 an SID, server 24 verifies that remote control 14 is authorized to be assigned an SID. For example, a user may maintain an account on servers 24 that includes permissions regarding which remote controls and controlled devices can be associated with the user account and assigned SIDs. Upon authorization (e.g., HTTP authorization using HTTP header information), servers 24 assign remote control 14 an SID.

Remote control 14 also transmits a message to server 24 that includes a remote control identifier and control information. For example, the remote control identifier may include the SID issued by severs 24 that identifies remote control 14 as being part of a session maintained by servers 24 (204). The control information may include data intended to alter the operation of controlled device 18 (e.g., stop playback of content, move to other content, etc.).

Server 24 then identifies controlled device 18 that is intended to receive the control information. For example, server 24 may query a database of stored identification numbers to determine which controlled device is associated with the session that includes the remote control identifier.

Server then transmits the control information to the intended controlled device 18 (210). In some examples, server 24 forwards the control information from the message directly to one or more controlled devices 18. In other examples, server 24 may process and/or repackage the control information of the message into a new message. After receiving the control information, controlled device 18 executes an action in accordance with the control information (212).

In some examples, multiple remote controls 14 can be paired with a single controlled device 18. For example, a plurality of remote controls 14 may be used by one or more users to scan the same QR code displayed on a single controlled device 18. In this example, the server may transmit a control message from each of the plurality of remote controls 14 to controlled device 18. Server 24 may also maintain a priority list that provides certain remote controls 14 with a higher priority than other remote controls. Upon receiving conflicting commands simultaneously, then, server 24 can refer to the priority list to determine which control information to send to controlled device 18.

Figure 7:
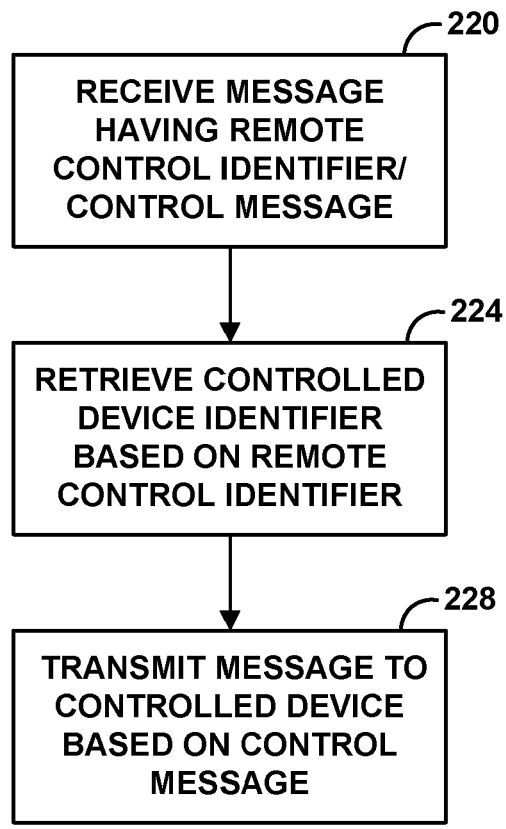
FIG. 7 is a flowchart illustrating an example operation of a network server communicating with a remote control, in accordance with one aspect of the present disclosure.

FIG. 7 is a flowchart illustrating an example operation of a network server handling communication between a remote control and a controlled device, in accordance with one aspect of the present disclosure. For purposes of illustration only, the method of FIG. 7 is described with respect to networked environment 10 of FIG. 1, though various other systems and/or devices may be utilized to implement or perform the method shown in FIG. 7.

In some examples, server 24 receives a message from remote control 14 having a remote control identifier and control information (220). For example, the message from remote control 14 may contain an SID issued by servers 24 that identifies remote control 14 as being part of a session. In addition, the message may contain control information intended to alter the operation of one or more controlled devices 18 (e.g., stop playback, begin next payback item, etc.). After receiving the message from remote control 14, server 24 retrieves a controlled device identifier that identifies one or more controlled devices 18 intended to receive the control information (224). For example, server 24 may query a database of stored identification numbers to determine which controlled device is associated with the session that includes the remote control identifier. Server 24 then transmits a message to the intended recipients (one or more controlled devices 18) of the control information (228). In some examples, server 24 forward the control information from the first message directly to one or more controlled devices 18. In other examples, server 24 may process and/or repackage the control information of the message from remote control 14 into a new message, which can be sent to the intended recipients of the control information.

Server 24 may, in some examples, initialize a group session upon receiving the message from remote control 14. For example, server 24 may maintain a session that includes the identifiers for all of the components sending and receiving messages (e.g., remote control(s) 14 and controlled device(s) 18). The session may be maintained by a device management module (such as device management module 168 shown in FIG. 5) of server 24 in order to efficiently route the messages from remote control 14 to controlled device 18, as well as messages from controlled device 18 to remote control 14 (e.g., as discussed below with respect to FIGS. 8 and 9). Server 24 may store identifiers associated with a session in a data repository (such as data repository 172 shown in FIG. 5).

Figure 8:
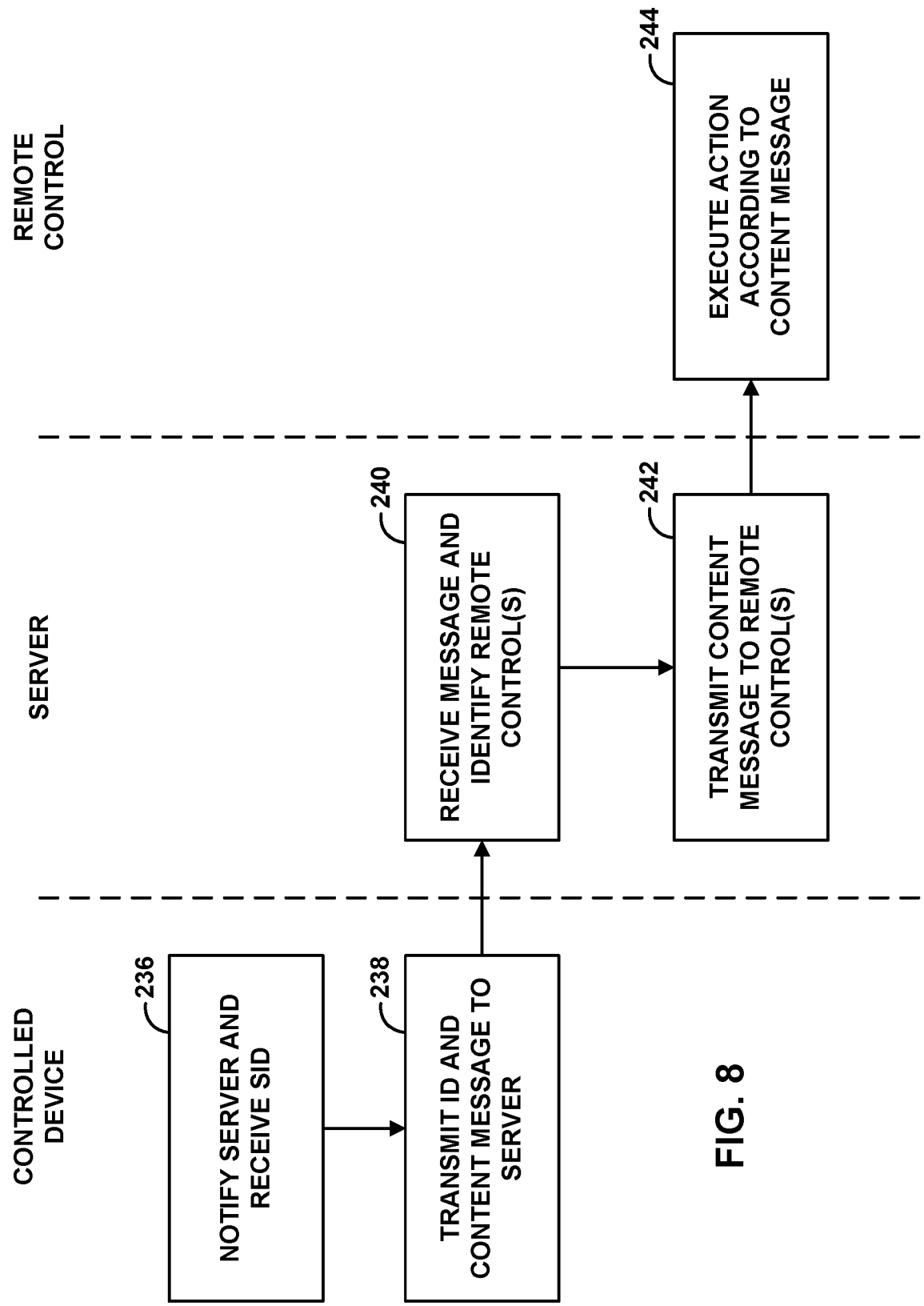
FIG. 8 is a flowchart illustrating an example operation of a controlled device communicating with a network server, in accordance with one aspect of the present disclosure.

FIG. 8 is a flowchart illustrating an example operation of a network server handling communication between a controlled device and a remote control, in accordance with one aspect of the present disclosure. For purposes of illustration only, the method of FIG. 8 is described with respect to networked environment 10 of FIG. 1, though various other systems and/or devices may be utilized to implement or perform the method shown in FIG. 8.

According to some examples, controlled device 18 notifies servers 24 that controlled device 18 is connected to network 22, and servers 24 assign controlled device 18 a controlled device identifier (e.g., a unique SID) (236). Controlled device 18 may notify servers 24, for example, automatically upon being powered on. In another example, a user may log in to a user account maintained by the servers 24 using an application on controlled device 18 (e.g., a web browser application), thereby notifying servers 24 that controlled device 18 is connected to network 22. In some examples, prior to assigning controlled device 18 an SID, server 24 verifies that controlled device 18 is authorized to be assigned an SID. For example, a user may maintain an account on servers 24 that includes permissions regarding which remote controls and controlled devices can be associated with the user account and assigned SIDs. Upon authorization (e.g., HTTP authorization using HTTP header information), servers 24 assign controlled device 18 an SID.

Controlled device 18 also transmits a message to server 24 that includes a controlled device identifier and content information. For example, the controlled device identifier may include the SID issued by severs 24 that identifies controlled device 18 as being part of a session (238). The content information may include data intended to update a user interface of remote control 14 (e.g., update playlist information, request user to take action regarding content playback, notify user that playback of new content has begun, and the like).

Server 24 then receives the message from controlled device 18 and identifies remote control 14 that is intended to receive the content information (240). For example, server 24 may query a database of stored identification numbers to determine which remote control 14 is associated with the session that includes the controlled device identifier. Server 24 then transmits the control information to the intended controlled device 18 (242). In some examples, server 24 forwards the content information from the message directly to one or more remote controls 14. In other examples, server 24 may process and/or repackage the content information of the message into a new message. After receiving the content message from server 24, remote control executes an action in accordance with the message (e.g., update a user interface of remote control 14) (244)).

Messages other than those specifically described with respect to FIG. 8 may also be exchanged between controlled device 18 and server 24. According to some aspects of the disclosure, controlled device 18 may complete a preliminary identification process, during which server 24 supplies controlled device 18 with an identification number. For example, prior to transmitting a message to remote control 14, controlled device 18 may initiate contact with server 24 to request an identification number. Server 24 may then generate an identification number and transmit the identification number to controlled device 18. Controlled device 18 can then incorporate that identification number into the identifier portion of the message described above.

Figure 9:
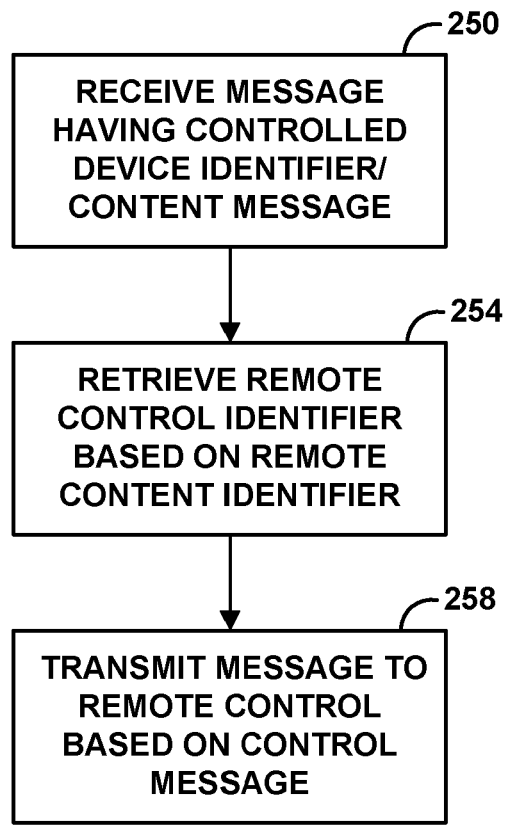
FIG. 9 is a flowchart illustrating an example operation of a network server communicating with a controlled device, in accordance with one aspect of the present disclosure.

FIG. 9 is a flowchart illustrating an example operation of a controlled device communicating with a network server, in accordance with one aspect of the present disclosure. For purposes of illustration only, the method of FIG. 9 is described with respect to networked environment 10 of FIG.

1, though various other systems and/or devices may be utilized to implement or perform the method shown in FIG. 9.

In some examples, server 24 receives a message from controlled device 18 having a controlled device identifier and content information (250). For example, the message from controlled device 18 may contain an SID issued by servers 24 that identifies controlled device 18 as being part of a session. In addition, the message may contain content information intended to notify a user of an event regarding controlled device 18, or to prompt a user of remote control 14 to take an action (e.g., notification that playback has stopped, notification that playback of new content has begun, and the like). The content information may be used, for example, to update a user interface of remote control 14.

After receiving the message from controlled device 18, server 24 retrieves a remote control identifier that identifies one or more remote controls 14 intended to receive the content information (224). For example, server 24 may query a database of stored identification numbers to determine which remote control 14 is associated with the session that includes the remote control identifier. Server 24 then transmits a message to the indeed recipients (one or more remote controls 14) of the content information (258). In some examples, server 24 forwards the content information from the first message directly to one or more remote controls 14. In other examples, server 24 may process and/or repackage the content information of the message from controlled device 18 into a new message, which can be sent to the intended recipients of the content information.

The messages described with respect to FIGS. 5-9 may be may be transmitted according to HTTP protocol. Other protocols, however, may also be implemented. For example, Extensible Messaging and Presence Protocol (XMPP) or Remote Procedure Call (RPC) protocols can also be implemented.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor. In various aspects, an article of manufacture may comprise one or more computer-readable media.

A computer-readable medium may form part of a computer program product, which may include packaging materials. A computer-readable medium may comprise a computer data storage medium such as RAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples of the disclosure have been described. These and other embodiments are within the scope of the following claims.

What is claimed is:

1. A computer-implemented method comprising:
launching, using a hardware processor on a remote control device, a remote control application;
authenticating, using the hardware processor, the remote control device by transmitting, using the remote control application, user account information associated with a user account to a server and determining whether the user account includes a permission corresponding to the remote control device;
receiving, using the hardware processor, a unique identifier that was assigned to the remote control device;
causing, using the hardware processor, a user interface to be presented on a display of the remote control device, wherein the user interface presents a plurality of previously paired controlled devices for selection;
receiving, via the user interface, a selection of two or more controlled devices from the plurality of previously paired controlled devices;
generating, using the hardware processor, a session with the two or more controlled devices using the unique identifier; and
controlling, using the hardware processor, a media playback of the two or more controlled devices by transmitting messages containing control information and the unique identifier to a network service.

2. The method of claim 1, further comprising transmitting a notification that the remote control device is connected to a communication network.

3. The method of claim 1, wherein the user account includes permissions regarding a plurality of remote control devices and a plurality of controlled devices that are associated with the user account.

4. The method of claim 1, wherein the unique identifier uniquely identifies the remote control device.

5. The method of claim 1, wherein the plurality of previously paired controlled devices are associated with permissions corresponding to each of the plurality of previously paired controlled devices and wherein each of the plurality of previously paired controlled devices is uniquely identified by a controlled device identifier.

6. The method of claim 1, wherein the messages include a message to the two or more controlled devices to manage playback of a media content item being presented using the two or more controlled devices.

7. The method of claim 1, further comprising receiving event messages from the two or more controlled devices, wherein the event messages relate to one or more media content items being presented using the two or more controlled devices.

8. The method of claim 1, further comprising:
receiving a preview of a media content item being presented using the two or more controlled devices; and updating the user interface to include the preview of the media content item.

9. The method of claim 1, further comprising:
receiving a playlist of future media content items to be presented using the two or more controlled devices; and
updating the user interface to include the playlist of future media content items.

10. The method of claim 1, wherein the two or more controlled devices are associated with controlled device identifiers that uniquely identify the two or more controlled devices, and wherein the unique identifier and the controlled device identifiers are associated with the session.

11. A remote control device comprising:
a memory; and
a hardware processor that, when executing computer executable instructions stored in the memory, is configured to:
launch a remote control application;
authenticate the remote control device by transmitting, using the remote control application, user account information associated with a user account to a server and determining whether the user account includes a permission corresponding to the remote control device;
receive a unique identifier that was assigned to the remote control device;
cause a user interface to be presented on a display of the remote control device, wherein the user interface presents a plurality of previously paired controlled devices for selection;
receive, via the user interface, a selection of two or more controlled devices from the plurality of previously paired controlled devices;
generate a session with the two or more controlled devices using the unique identifier; and
control a media playback of the two or more controlled devices by transmitting messages containing control information and the unique identifier to a network service.

12. The remote control device of claim 11, wherein the hardware processor is further configured to transmit a notification that the remote control device is connected to a communication network.

13. The remote control device of claim 11, wherein the user account includes permissions regarding a plurality of remote control device and a plurality of controlled devices that are associated with the user account.

14. The remote control device of claim 11, wherein the plurality of previously paired controlled devices are associated with permissions corresponding to each of the plurality of previously paired controlled devices and wherein each of the plurality of previously paired controlled devices is uniquely identified by a controlled device identifier.

15. The remote control device of claim 11, wherein the messages include a message to the two or more controlled devices to manage playback of a media content item being presented using the two or more controlled devices.

16. The remote control device of claim 11, wherein the hardware processor is further configured to receive event messages from the two or more controlled devices, wherein the event messages relate to one or more media content items being presented using the two or more controlled devices.

17. The remote control device of claim 11, wherein the hardware processor is further configured to:
receive a preview of a media content item being presented using the two or more controlled devices; and
update the user interface to include the preview of the media content item.

18. The remote control device of claim 11, wherein the hardware processor is further configured to:
receive a playlist of future media content items to be presented using the two or more controlled devices; and
update the user interface to include the playlist of future media content items.

19. The remote control device of claim 11, wherein the two or more controlled devices are associated with controlled device identifiers that uniquely identify the two or more controlled devices, and wherein the unique identifier and the controlled device identifiers are associated with the session.

20. A non-transitory computer-readable medium containing computer-executable instructions that, when executed by a processor, cause the process to perform a method for providing media guidance with a plurality of media sources, the method comprising:
launching, on a remote control device, a remote control application;
authenticating the remote control device by transmitting, using the remote control application, user account information associated with a user account to a server and determining whether the user account includes a permission corresponding to the remote control device;
receiving a unique identifier that was assigned to the remote control device;
causing a user interface to be presented on a display of the remote control device, wherein the user interface presents a plurality of previously paired controlled devices for selection;
receiving, via the user interface, a selection of two or more controlled devices from the plurality of previously paired controlled devices;
generating a session with the two or more controlled devices using the unique identifier; and
controlling a media playback of the two or more controlled devices by transmitting messages containing control information and the unique identifier to a network service.

\* \* \* \* \*